United States Patent Office 2,960,475
Patented Nov. 15, 1960

2,960,475

THORIUM-CONTAINING GETTERS FOR ELECTRIC DISCHARGE TUBES

Egon Otto Michael Baronetzky, Aachen, Germany, and Johannes Hendrikus Nicolaas Van Vucht, Eindhoven, Netherlands, assignors to North American Philips Company, Inc., New York, N.Y., a corporation of Delaware No Drawing. Filed Dec. 29, 1958, Ser. No. 783,115

Claims priority, application Netherlands Jan. 30, 1958

4 Claims. (Cl. 252—181.6)

This invention relates to methods of manufacturing a thorium-containing getter for an electric discharge tube, in which powdery thorium is mixed with aluminium, likewise in the pulverulent state, whereupon the resultant mixture is sintered and ground and provided with the use of a binder liquid on a metal surface, or the resultant mixture is pressed into a tablet which is mounted in a discharge tube. The invention also relates to a getter obtained by such a method and to an electric discharge tube provided with such a getter.

In getters of the known kind, in which the mixture is first sintered and subsequently pulverized, the aluminium is in certain cases added in the form of an alloy containing cerium, cerium mixed metal or lanthanum. The gas-binding properties are then partly lost due to the sintering and subsequent grinding processes.

In the mixtures pressed into tablets, the aluminium is sometimes added in the form of the above-mentioned alloy and, if desired, the powder of a metal, such as nickel, is added so that after an initial heating process the getter is activated wholly of its own accord due to the reaction heat liberated.

With the last-mentioned kinds of getters it may occur, more particularly in the case of comparatively large contents of aluminium, that after absorption of oxygen no gas and specially no hydrogen is absorbed any more. The latter phenomenon may be attributable to the formation of a closed oxide film.

An object of the invention is to provide a method leading to a getter which has a good activity for hydrogen and other gases even after absorption of a large amount of oxygen.

According to the invention in a method of manufacturing a thorium-containing getter for an electric discharge tube, in which powdery thorium is mixed with aluminium, likewise in the pulverulent state, which mixture is worked in known manner into a getter, the aluminium is partly substituted by one or more of the following metals: silver, gold, copper and palladium.

It is already known that the compound $Th_2Ag$ is pyroforous, which does not mean that getter properties are present. Apart from that this compound itself, due to decomposition, would actually be unsuitable for use as a getter, even apart from the gas-binding properties. The material is technically not workable.

In the case of the substitution of aluminium by silver, the getter preferably has the gross composition $Th_{16}Al_mAg_n$, wherein $m$ and $n$ are each at least 1 and $m+n=8$. Similar rules apply in the case that, instead of silver, one of the other metals is chosen. Thus, the composition $Th_{16}Al_6Cu_2$ has very favorable properties for binding CO, whilst the autocatalytic absorption of hydrogen after preceding absorption of oxygen is also very satisfactory. The composition $Th_{16}Al_6Au_2$ is especially advantageous for absorbing mixtures of $CH_4$ and CO at increased temperature, and also of mixtures of $H_2$ and CO.

The invention will now be explained more fully with reference to the examples following hereinafter.

A number of tablets was pressed of the composition $Th_{16}Al_mAg_n$, wherein $m+n=8$. It has been found that those compositions in which $n$ lies between 2 and 6, are most favorable for the absorption of hydrogen after preceding absorption of oxygen. This applies to the time in which the absorption of hydrogen begins and also to the speed at which the absorption once started is accomplished.

In a similar manner, tablets were pressed of the gross compositions $Th_{16}Al_6Cu_2$ and $Th_{16}Al_6Au_2$, which were found to have favorable properties.

Even after pulverization of the sintered mixtures and the application to a metal surface, a satisfactory gas-binding activity may be obtained after heating.

What is claimed is:

1. As a getter for an electric discharge tube, a mixture having the gross composition $Th_{16}Al_mM_n$, in which M is a metal selected from the group consisting of silver, gold, copper and palladium, and in which $m$ and $n$ are at least equal to 1 and $m+n=8$.

2. As a getter for an electric discharge tube, a mixture having the gross composition $Th_{16}Al_mAg_n$, in which $m$ and $n$ are each at least 1 and $m+n=8$.

3. As a getter for an electric discharge tube, a mixture having the gross composition $Th_{16}Al_6Cu_2$.

4. As a getter for an electric discharge tube, a mixture having the gross composition $Th_{16}Al_6Au_2$.

References Cited in the file of this patent

UNITED STATES PATENTS

| | | |
|---|---|---|
| 255,362 | Weston | Mar. 21, 1882 |
| 1,760,454 | Ulrey | May 27, 1930 |
| 2,449,786 | Lockwood et al. | Sept. 21, 1948 |

OTHER REFERENCES

Udy et al.: The Properties of Thorium Alloys, U.S. Atomic Energy Comm., BMI-89, Sept. 15, 1951.